US011932256B2

(12) United States Patent
Rangarajan et al.

(10) Patent No.: US 11,932,256 B2
(45) Date of Patent: Mar. 19, 2024

(54) SYSTEM AND METHOD TO IDENTIFY A LOCATION OF AN OCCUPANT IN A VEHICLE

(71) Applicant: Ford Global Technologies, LLC, Dearborn, MI (US)

(72) Inventors: Ranjani Rangarajan, Farmington Hills, MI (US); Leah Busch, Berkley, MI (US); Karthik Krishnamurthy, Farmington Hills, MI (US); Nikhitha Bekkanti, Farmington Hills, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 336 days.

(21) Appl. No.: 17/529,980

(22) Filed: Nov. 18, 2021

(65) Prior Publication Data

US 2023/0150513 A1    May 18, 2023

(51) Int. Cl.
*B60W 40/09* (2012.01)
*B60W 40/08* (2012.01)

(52) U.S. Cl.
CPC ..... *B60W 40/09* (2013.01); *B60W 2040/0809* (2013.01); *B60W 2540/21* (2020.02)

(58) Field of Classification Search
CPC ......... B60W 40/09; B60W 2040/0809; B60W 2540/21; B60W 2040/0881; B60W 2050/0026; B60W 2050/0091; B60W 40/08; B60W 50/00; B60W 2040/089; B60W 2050/0019; B60K 2370/148; B60K 2370/736; B60K 2370/739; B60K 2370/741; B60K 37/06; B60K 35/00; G10L 25/21

USPC .............................................................. 701/1
See application file for complete search history.

(56) References Cited

U.S. PATENT DOCUMENTS

| 7,085,635 | B2 | 8/2006 | Boman et al. |
| 9,761,223 | B2 | 9/2017 | Blommer et al. |
| 10,464,530 | B2 | 11/2019 | Falkson et al. |
| 2006/0085183 | A1* | 4/2006 | Jain .................. G10L 17/26 704/E15.044 |
| 2009/0055180 | A1 | 2/2009 | Coon et al. |

(Continued)

OTHER PUBLICATIONS

Scott Amman et al., The Impact of Microphone Location and Beamforming on In-Vehicle Speech Recognition, SAE International by the University of Michigan, Jul. 29, 2018, 430-433.

*Primary Examiner* — Muhammad Shafi
(74) *Attorney, Agent, or Firm* — Frank Lollo; Eversheds Sutherland (US) LLP

(57) ABSTRACT

The disclosure generally pertains to systems and methods for identifying a location of an occupant in a vehicle. In an example method, a processor deconvolves a vocal utterance by an occupant of a vehicle and also determines an angle of arrival of the vocal utterance. The location of the occupant in the vehicle is then identified by the processor based on evaluating the deconvolved vocal utterance and the angle of arrival of the vocal utterance. Deconvolving the vocal utterance can involve applying a cabin impulse response to the vocal utterance for eliminating undesirable effects that may be imposed upon the vocal utterance by acoustic characteristics of the cabin of the vehicle (echo, sound reflections, sound damping, reverberation etc.). In some applications, the processor may refer to a lookup table to estimate a location of the occupant in the vehicle.

17 Claims, 4 Drawing Sheets

(56) References Cited

U.S. PATENT DOCUMENTS

| | | | |
|---|---|---|---|
| 2015/0170659 A1* | 6/2015 | Kushner | G10L 21/02 704/500 |
| 2016/0039356 A1 | 2/2016 | Talwar et al. | |
| 2016/0055863 A1* | 2/2016 | Kato | G10L 21/034 704/203 |
| 2018/0190307 A1* | 7/2018 | Hetherington | H04M 9/082 |
| 2018/0211681 A1* | 7/2018 | Miyabe | H04R 3/04 |
| 2019/0221210 A1* | 7/2019 | Song | G10L 15/22 |
| 2022/0201481 A1* | 6/2022 | Martindale | G06V 40/197 |

* cited by examiner

| Speaker | Voice Amplitude | Angle of Arrival |
|---|---|---|
| Driver Seat Occupant | 81-87 dB | 50-95 degrees |
| Front Passenger Seat Occupant | 74-80 dB | 100-165 degrees |
| Rear Passenger Seat Occupant (Driver Side) | 67-70 dB | 65-95 degrees |
| Rear Passenger Seat Occupant (Center) | 62-67 dB | 100-145 degrees |
| Rear Passenger Seat Occupant (Passenger Side) | 57-61 dB | 145-170 degrees |

FIG. 3

SYSTEM AND METHOD TO IDENTIFY A LOCATION OF AN OCCUPANT IN A VEHICLE

BACKGROUND

Automobile manufacturers constantly strive to incorporate into their automobiles various features that make their automobiles more attractive to buyers. Some of these features may be operated through voice commands such as, for example, a phone system that can dial a number in response to a voice command, an infotainment system that tunes to a specific radio station in response to a voice command, or a vehicle computer that performs an action upon a vehicle in response to a voice command. The effectiveness of actions carried out by such features is dependent in large part upon an accurate interpretation of the voice command. In some cases, extraneous noise such as, for example, engine noise and road noise, may interfere with the interpretation process. More particularly, it may be difficult for a feature to identify and respond to a voice command issued by an occupant of the vehicle when other occupants of the vehicle are conversing with each other. It is therefore desirable to configure the feature to detect a location of the issuer of the voice command in order to perform an accurate interpretation of the voice command.

BRIEF DESCRIPTION OF THE DRAWINGS

A detailed description is set forth below with reference to the accompanying drawings. The use of the same reference numerals may indicate similar or identical items. Various embodiments may utilize elements and/or components other than those illustrated in the drawings, and some elements and/or components may not be present in various embodiments. Elements and/or components in the figures are not necessarily drawn to scale. Throughout this disclosure, depending on the context, singular and plural terminology may be used interchangeably.

FIG. 3 shows a lookup table that includes some example voice amplitude and angle of arrival data.

DETAILED DESCRIPTION

Overview

Figure 1:
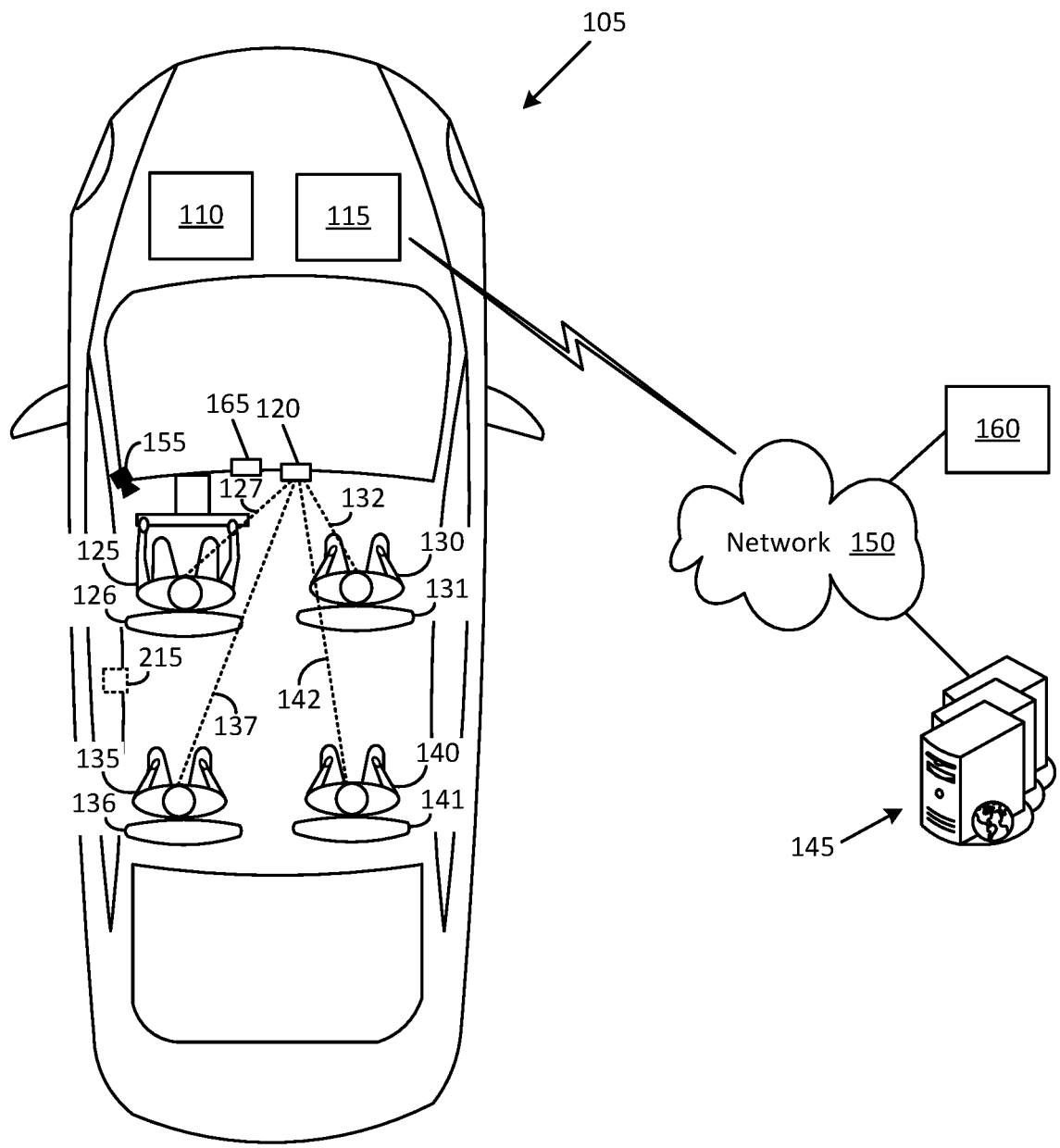
FIG. 1 illustrates an example vehicle that includes an occupant locator system in accordance with an embodiment of the disclosure.

In terms of a general overview, certain embodiments described in this disclosure are directed to systems and methods for identifying a location of an occupant in a vehicle. In an example method, a processor deconvolves a vocal utterance by an occupant of a vehicle and also determines an angle of arrival of the vocal utterance. The location of the occupant in the vehicle is then identified by the processor based on evaluating the deconvolved vocal utterance and the angle of arrival of the vocal utterance. Deconvolving the vocal utterance can involve applying a cabin impulse response to the vocal utterance for eliminating undesirable effects that may be imposed upon the vocal utterance by acoustic characteristics of the cabin of the vehicle (echo, sound reflections, sound damping, reverberation etc.). In some applications, the processor may refer to a lookup table to estimate a location of the occupant in the vehicle.

Illustrative Embodiments

The disclosure will be described more fully hereinafter with reference to the accompanying drawings, in which example embodiments of the disclosure are shown. This disclosure may, however, be embodied in many different forms and should not be construed as limited to the example embodiments set forth herein. It will be apparent to persons skilled in the relevant art that various changes in form and detail can be made to various embodiments without departing from the spirit and scope of the present disclosure. Thus, the breadth and scope of the present disclosure should not be limited by any of the described example embodiments but should be defined only in accordance with the claims and their equivalents. The description below has been presented for the purposes of illustration and is not intended to be exhaustive or to be limited to the precise form disclosed. It should be understood that alternate implementations may be used in any combination desired to form additional hybrid implementations of the present disclosure.

Furthermore, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments.

Certain words and phrases are used herein solely for convenience and such words and terms should be interpreted as referring to various objects and actions that are generally understood in various forms and equivalencies by persons of ordinary skill in the art. For example, the word "occupant" as used herein refers to any individual who is present inside a vehicle such as a driver of the vehicle or a passenger in the vehicle. The phrase "vocal utterance" as used herein refers to any of various types of speech that may be used for various purposes including, for example, voice commands issued by an individual to a voice-controlled device located in the vehicle in order to command the device to perform an operation. The voice-controlled device can be any of various devices such as, for example, an infotainment system, a phone system, an audio recording device, and a computer. Some example actions include dialing a phone number, selecting a radio station, turning off the device, turning on the device, voice recognition, voice recording, and speech-to-text conversion.

It must also be understood that words such as "implementation," "scenario," "case," and "situation" as used herein are an abbreviated version of the phrase "In an example ("implementation," "scenario," "case," "approach," and "situation") in accordance with the disclosure." Furthermore, the word "example" as used herein is intended to be non-exclusionary and non-limiting in nature.

FIG. 1 illustrates an example vehicle 105 that includes an occupant locator system 115 in accordance with an embodiment of the disclosure. The vehicle 105 may be any of various types of vehicles such as, for example, a gasoline powered vehicle, an electric vehicle, a hybrid electric vehicle, an autonomous vehicle, a sedan, a van, a minivan, a sports utility vehicle, a truck, a station wagon, or a bus. The illustrated example vehicle 105 contains four seats. In other embodiments, the vehicle 105 can have fewer or larger number of seats.

The vehicle 105 can include various devices, at least some of which are voice-operated, such as, for example, a telephone system having a voice-activated dialer, and an infotainment system 165 having a voice-activated station selector. Some devices, such as, for example, a smartphone and/or a smartwatch, may be brought into the vehicle 105 by various individuals. The voice-operated devices provided in the vehicle and/or brought into the vehicle 105, may be communicatively coupled to the occupant locator system 115 via wired (vehicle bus, coaxial jack, USB port, etc.) or wireless communication links (Bluetooth®, Ultra-Wideband (UWB), cellular, Wi-Fi, Zigbee®, near-field-communications (NFC), etc.). Each voice-operated device may be configured to respond to voice commands that are operated upon by the occupant locator system 115 prior to forwarding to the voice-operated device.

The vehicle 105 may further include components such as, for example, a vehicle computer 110, a camera 155, and an audio sensor 120. The vehicle computer 110 may perform various operations associated with the vehicle 105, such as controlling engine operations (fuel injection, speed control, emissions control, braking, etc.), managing climate controls (air conditioning, heating etc.), activating airbags, and issuing warnings (check engine light, bulb failure, low tire pressure, etc.). The camera 155 may be used for various purposes such as, for example, to monitor an activity of a driver 125 of the vehicle 105 (to detect drowsiness, for example).

In at least some scenarios, the driver 125 (or another individual present in the vehicle 105) may opt to turn off the camera 155 in order to obtain privacy. As a result, the camera 155 is rendered unusable for capturing images and audio signals. However, audio signals such as vocal utterances by occupants of the vehicle 105, can be captured by the audio sensor 120 and conveyed to the occupant locator system 115 in accordance with the disclosure.

The audio sensor 120 can be provided in various forms. In an example implementation, the audio sensor 120 may be provided in the form of a single microphone. In another example implementation, the audio sensor 120 may be provided in the form of multiple microphones. The multiple microphones may be components of a microphone array apparatus that may be mounted on the roof of the vehicle 105 (near the front windshield or above the rear-view mirror). The multiple microphones may also be individual microphones that are mounted upon various parts of the vehicle 105 (side pillar, rear window, roof, etc.).

In some applications, the vehicle computer 110 and the occupant locator system 115 are configured to communicate via a network 150 with devices located outside the vehicle 105 such as, for example, a computer 145 (a server computer, a cloud computer, etc.) and/or a cloud storage device 160.

The network 150 may include any one, or a combination of networks, such as, for example, a local area network (LAN), a wide area network (WAN), a telephone network, a cellular network, a cable network, a wireless network, and/or private/public networks such as the Internet. The network 150 may support any of various communication technologies such as, for example, Wi-Fi, Wi-Fi direct, Ultra-Wideband (UBW), cellular, machine-to-machine communication, and/or man-to-machine communication.

In the illustrated scenario, the occupant locator system 115 is configured to execute various functions associated with identifying a location of the driver 125 and/or a passenger of the vehicle 105. The occupant locator system 115 may be further configured to determine an identity of the driver 125 or a passenger of the vehicle 105. In an example implementation, the occupant locator system 115 is communicatively coupled to the vehicle computer 110 and the infotainment system 165 via wired and/or wireless connections. More particularly, the occupant locator system 115 may be communicatively coupled to the vehicle computer 110 and the infotainment system 165 via a vehicle bus that uses a controller area network (CAN) bus protocol, a Media Oriented Systems Transport (MOST) bus protocol, and/or a CAN flexible data (CAN-FD) bus protocol. In another implementation, the communications may be provided via wireless technologies such as Bluetooth®, Ultra-Wideband (UWB), cellular, Wi-Fi, Zigbee®, or near-field-communications (NFC).

The infotainment system 165 can include elements such as, for example, a radio, an MP3 player, a global positioning system (GPS) device, a clock, and a display screen. The infotainment system 165 can further include a graphical user interface (GUI) or a human machine interface (HMI) that is displayed on the display screen. The GUI or HMI accepts input from an occupant of the vehicle 105 (the driver 125, for example), and/or displays various items pertaining to the occupant locator system 115. An example item that may be displayed on the display screen of the infotainment system 165 can be a request for repeating a voice command issued by an occupant of the vehicle 105.

The various occupants of the vehicle 105 can include the driver 125 who is seated in a driver seat 126, a passenger 130 seated in a front passenger seat 131, a passenger 135 seated in a rear passenger seat 136 (driver side), and a passenger 140 seated in a rear passenger seat 141 (passenger side). In a five-seater vehicle, a center seat in the rear may be occupied by a fifth passenger.

A vocal utterance such as, for example, a voice command, uttered by the driver 125 can travel through the air via a direct path 127 to the audio sensor 120. A vocal utterance of the passenger 130 can travel through the air via a direct path 132 to the audio sensor 120. A vocal utterance of the passenger 135 can travel through the air via a direct path 137 to the audio sensor 120. A vocal utterance of the passenger 140 can travel through the air via a direct path 142 to the audio sensor 120. One or more of the various vocal utterances can also travel to the audio sensor 120 through auxiliary paths, and may inherit some acoustic characteristics as a result of contributory factors present in the cabin. The acoustic characteristics can include, for example, an echo, a delay, a reverberation, a damping, and/or signal attenuation. The contributory factors can include, for example, sound refection by glass windows, sound damping due to upholstery, and sound damping due to clothing worn by the occupants of the vehicle 105.

Vocal utterances can also be accompanied by noise from various sources such as, for example, from the engine of the vehicle 105, sound emanating from the infotainment system 165, and/or conversation between two or more occupants of the vehicle 105. The occupant locator system 115 may eliminate or minimize adverse acoustic characteristics (and noise components) prior to evaluating vocal utterances to identify a speaker in accordance with the disclosure. This aspect is described below in further detail.

Figure 2:
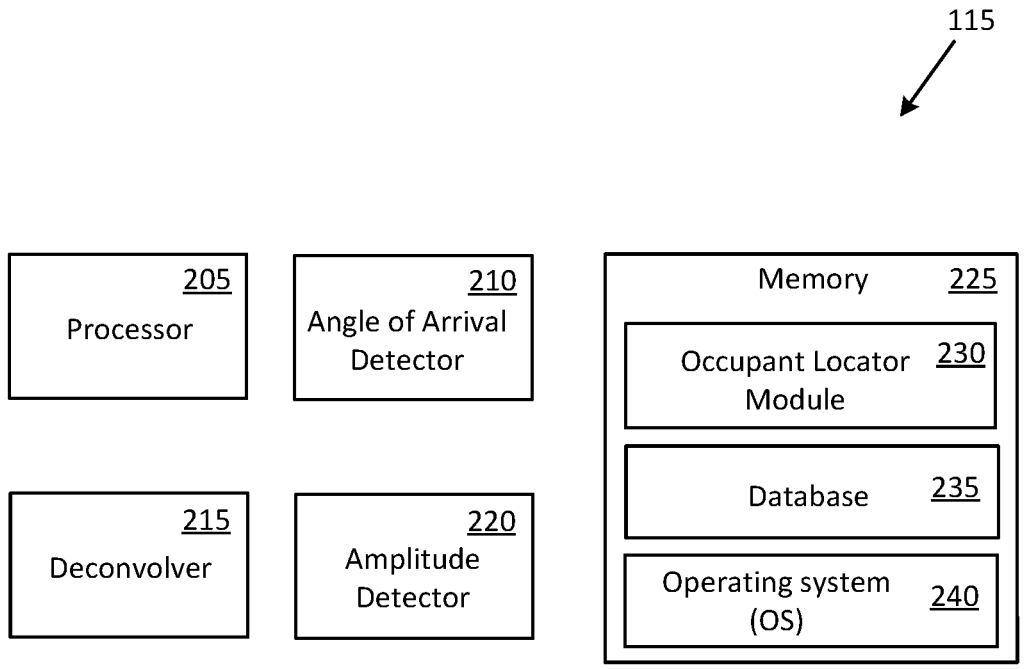
FIG. 2 shows a few example components of an occupant locator system in accordance with an embodiment of the disclosure.
Figure 2:
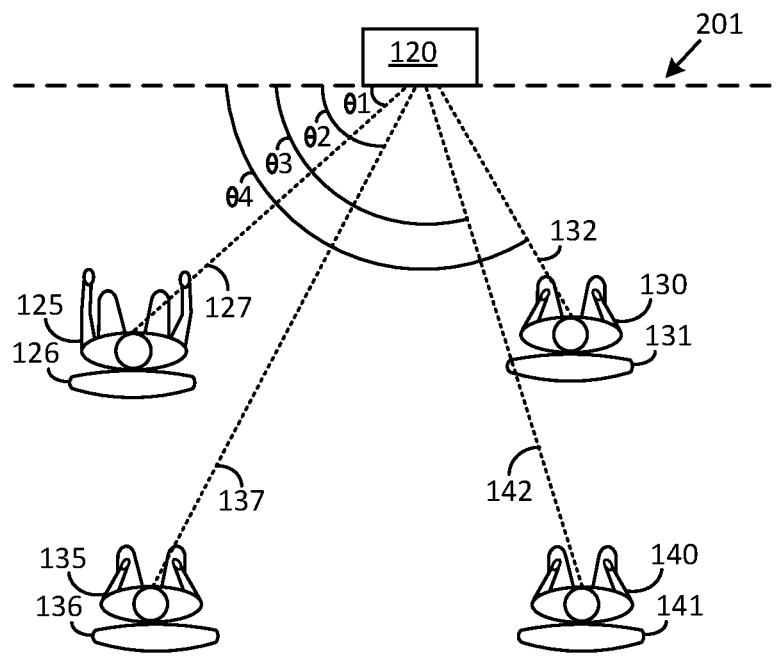

FIG. 2 shows a few example components of the occupant locator system 115 in accordance with an embodiment of the disclosure. The example components can include the audio sensor 120, a processor 205, a memory 225, a deconvolver 215, an angle of arrival detector 210, and an amplitude detector 220. It must be understood that the deconvolver 215, the angle of arrival detector 210, and the amplitude detector 220 are functional blocks that can be implemented in hardware, software, or a combination thereof. Some example hardware components can include a directional microphone, a noise filter, an audio amplifier, a signal level amplitude detector, and a signal processor. Some example software components can include a deconvolver module, a filter module, and a signal processing module.

In the illustrated example scenario, the audio sensor 120 is located upon a rear-view mirror provided on a front windshield of the vehicle 105. In other scenarios, the audio sensor 120 may be mounted elsewhere, such as, for example, in the infotainment system 165, on a roof portion of the cabin, on a side pillar, or on a rear portion of the cabin (rear window or behind a rear seat, for example). In some applications, more than one microphone may be provided for executing actions such as those described herein with reference to the audio sensor 120.

In a first example scenario, the audio sensor 120 receives an audio signal corresponding to a vocal utterance of the driver 125, for example. The audio signal travels to the audio sensor 120 via the direct path 127 and auxiliary paths (not shown). The driver seat 126 is located on a driver side of the vehicle 105 and the angle of arrival of the vocal utterance at the audio sensor 120 corresponds to θ1 degrees (with respect to a reference axis 201).

In a second example scenario, the audio sensor 120 receives an audio signal corresponding to a vocal utterance of the passenger 130. The audio signal in this case travels to the audio sensor 120 via the direct path 132 and auxiliary paths (not shown). The front passenger seat 131 in which the passenger 130 is seated is located on a front passenger side of the vehicle 105 and the angle of arrival of the vocal utterance at the audio sensor 120 corresponds to θ4 degrees (with respect to the reference axis 201).

In a third example scenario, the audio sensor 120 receives an audio signal corresponding to a vocal utterance of the passenger 135. The audio signal in this case travels to the audio sensor 120 via the direct path 137 and auxiliary paths (not shown). The rear passenger seat 136 in which the passenger 135 is seated is located on a driver side rear portion of the vehicle 105 and the angle of arrival of the vocal utterance at the audio sensor 120 corresponds to θ2 degrees (with respect to the reference axis 201).

In a fourth example scenario, the audio sensor 120 receives an audio signal corresponding to a vocal utterance of the passenger 140. The audio signal in this case travels to the audio sensor 120 via the direct path 142 and auxiliary paths (not shown). The rear passenger seat 141 in which the passenger 140 is seated is located on a passenger side rear portion of the vehicle 105 and the angle of arrival of the vocal utterance at the audio sensor 120 corresponds to θ3 degrees (with respect to the reference axis 201).

In a fifth example scenario, the audio sensor 120 receives an audio signal corresponding to a vocal utterance of a passenger (not shown) seated in a center seat between the passenger 135 and the passenger 140. The audio signal in this case travels to the audio sensor 120 via a direct path (not shown) located between the direct path 137 and the direct path 142.

The angle of arrival θ1 degrees and the angle of arrival θ4 are dependent on factors such as a separation distance between the driver seat 126 and the front passenger seat 131 and a width of the cabin of the vehicle 105. Similarly, the angle of arrival θ2 degrees and the angle of arrival θ3 are dependent on factors such as a separation distance between the rear passenger seat 136 and the rear passenger seat 141 and a width of the cabin of the vehicle 105.

An audio signal (such as any of the audio signals described above) received by the audio sensor 120 is evaluated by the processor 205 in order to detect parameters such as, for example, the angle of arrival and an amplitude of the audio signal and to determine therefrom, a location of an occupant of the vehicle 105 in accordance with the disclosure. The processor 205 may carry out the evaluation by executing computer-readable instructions stored in the memory 225. The memory 225, which is one example of a non-transitory computer-readable medium, may be used to store an operating system (OS) 240 and various code modules such as, for example, an occupant locator module 230. The code modules are provided in the form of computer-executable instructions that can be executed by the processor 205 for performing various operations in accordance with the disclosure. More particularly, the occupant locator module 230 may be executed by the processor 205 for performing various operations in accordance with the disclosure.

In an example implementation, the audio sensor 120, which can be a part of the angle of arrival detector 210, is a directional microphone having a narrow-beam cardioid polar pattern. The narrow-beam cardioid polar pattern characteristic allows the processor 205 to evaluate an audio signal received via the audio sensor 120 and determine an angle of arrival of the audio signal. In another example implementation, an array of directional microphones can be used to identify various angles of arrival of various audio signals such as, for example, when multiple occupants of the vehicle 105 provide vocal input to the occupant locator system 115.

An amplitude of an audio signal received by the audio sensor 120 may be determined by the processor 205 after the audio signal has been deconvolved by the deconvolver 215 and provided to sensor hardware. In an example implementation, a deconvolving procedure may be executed by the processor 205 using hardware and/or software associated with the deconvolver 215. The deconvolving procedure can include application of a cabin impulse response to the audio signal. The cabin impulse response represents acoustic characteristics of the cabin of the vehicle 105 and can be used to eliminate distortion and/or extraneous audio content present in the audio signal as a result of the acoustic characteristics.

FIG. 3 shows a lookup table 300 that includes some example voice amplitude and angle of arrival data. The voice amplitude and angle of arrival data may be obtained in various ways. In an example procedure, the data contained in the lookup table 300 is obtained by obtaining voice samples from one or more occupants of the vehicle 105 seated in one or more seats in the vehicle 105. In another example procedure, the voice samples may be obtained from one or more occupants seated in various makes and models of vehicles. The cabin impulse response of each of the different makes and models of vehicles can also be obtained (in addition to the voice samples) because the cabin impulse response of a vehicle of a first make or model (a Ford® Fusion sedan, for example) can be different in comparison to a cabin impulse response of a vehicle of a second make or model (a Ford® F150 truck, for example).

In an example implementation, the voice amplitude, angle of arrival data, and cabin impulse responses, may be used by the processor 205 during execution of a machine learning procedure for identifying the identity and/or location of an occupant in the vehicle 105 in accordance with the disclosure.

The example lookup table 300 includes data which indicates that an audio signal in the form of a vocal utterance issued by an occupant of a driver seat in a vehicle (such as, for example, the driver seat 126 in the vehicle 105), may have an amplitude ranging from about 81 dB to about 87 dB. The angle of arrival of the audio signal may typically range from about 50 degrees to about 95 degrees.

An audio signal in the form of a vocal utterance issued by an occupant of a front passenger seat in a vehicle (such as, for example, the front passenger seat 131 in the vehicle 105), may have an amplitude ranging from about 74 dB to about 80 dB. The angle of arrival of the audio signal may typically range from about 100 degrees to about 165 degrees.

An audio signal in the form of a vocal utterance issued by an occupant of a rear passenger seat in a vehicle (such as, for example, the rear passenger seat 136 in the vehicle 105), may have an amplitude ranging from about 67 dB to about 70 dB. The angle of arrival of the audio signal may typically range from about 65 degrees to about 95 degrees.

An audio signal in the form of a vocal utterance issued by an occupant of a rear center passenger seat in a vehicle (not shown in FIG. 2) may have an amplitude ranging from about 62 dB to about 67 dB. The angle of arrival of the audio signal may typically range from about 100 degrees to about 145 degrees.

An audio signal in the form of a vocal utterance issued by an occupant of another rear passenger seat in a vehicle (such as, for example, the rear passenger seat 141 in the vehicle 105), may have an amplitude ranging from about 57 dB to about 61 dB. The angle of arrival of the audio signal may typically range from about 145 degrees to about 170 degrees.

Figure 4:
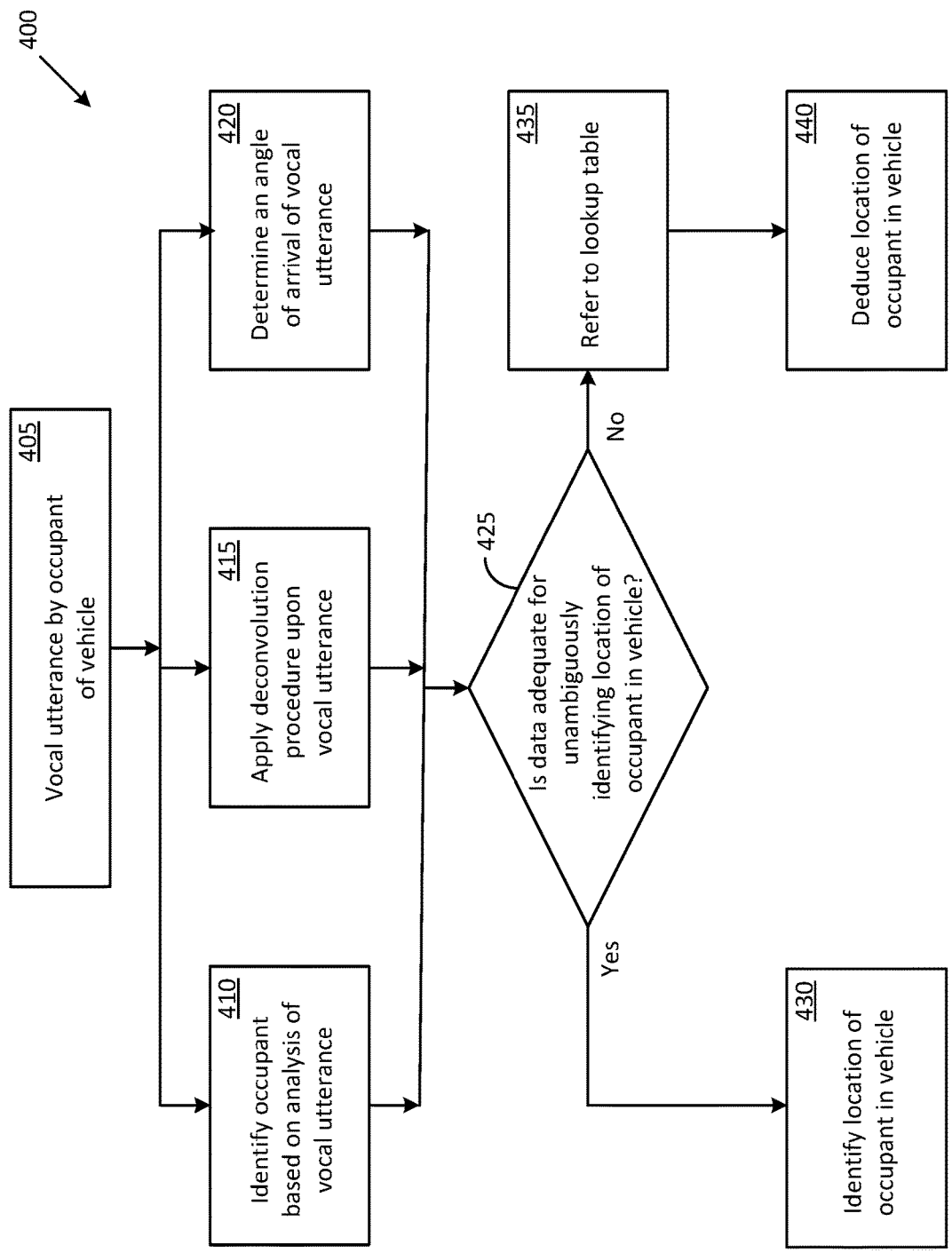
FIG. 4 shows a flowchart of an example method to identify a location of an occupant in a vehicle in accordance with an embodiment of the disclosure.

FIG. 4 shows a flowchart 400 of an example method to identify a location of an occupant (driver or passenger) in a vehicle in accordance with an embodiment of the disclosure. The flowchart 400 illustrates a sequence of operations that can be implemented in hardware, software, or a combination thereof. In the context of software, the operations represent computer-executable instructions stored on one or more non-transitory computer-readable media such as the memory 225 that is a part of the occupant locator system 115, that, when executed by one or more processors such as the processor 205 that is a part of the occupant locator system 115, perform the recited operations. Generally, computer-executable instructions include routines, programs, objects, components, data structures, and the like that perform particular functions or implement particular abstract data types. The order in which the operations are described is not intended to be construed as a limitation, and any number of the described operations may be carried out in a different order, omitted, combined in any order, and/or carried out in parallel. The description below may make reference to certain components and objects shown in FIG. 1 through FIG. 3, but it should be understood that the description is equally applicable to various other components and embodiments.

At block 405, an occupant of the vehicle 105 produces a vocal utterance (such as, for example, the driver 125 issuing a voice command to the infotainment system 165 to tune to a desired radio station). At block 410, the processor 205 of the occupant locator system 115 may evaluate the vocal utterance and identify the individual who produced the vocal utterance (the driver 125, in this example). The evaluation may be carried out for example, by the processor 205 executing the occupant locator module 230 and by using data stored in the database 235. At least some of the data stored in the database 235 may be obtained as a part of a machine learning procedure that is used to uniquely determine an identity of one or more occupants of the vehicle 105. In an example scenario, the occupant locator module 230 may access the database 235 to retrieve voice samples of the driver 125 (and other occupants of the vehicle 105) and perform a voice recognition procedure based on use of the voice samples. The voice sample, which may have been previously stored in the database 235 by way of a training procedure, can include content such as, for example, a spectral signature, voice amplitude information, and voice characteristics (pitch, tone, etc.). In some implementations, the operations indicated in block 410 may be omitted.

At block 415, the processor 205 of the occupant locator system 115 may apply a deconvolution procedure upon the vocal utterance. The operation indicated in block 415 may be performed substantially concurrently with the operation indicated in block 410, or at a different time. The deconvolution procedure may be performed in cooperation with the deconvolver 215 (shown in FIG. 2) and can include application of a cabin impulse response to the vocal utterance. The cabin impulse response, which may also be stored in the database 235, represents acoustic characteristics of the cabin of the vehicle 105 and can be used to eliminate distortion and/or extraneous audio content present in the vocal utterance as a result of the acoustic characteristics.

At block 420, the processor 205 of the occupant locator system 115 may cooperate with the angle of arrival detector 210 to determine an angle of arrival of the vocal utterance. In an example implementation, the angle of arrival may be determined by evaluating an amplitude of the vocal utterance received in each microphone an array of microphones (audio sensor 120) arranged to receive audio signals from various directions. Thus, for example, a "$m^{th}$" microphone (among "n" microphones) that is pointed towards the driver 125 may produce an output having a higher amplitude than a "$p^{th}$" microphone in the array that is pointed towards the passenger 130, when the driver 125 is the speaker. The "n" microphones can be implemented in the form of a single array (audio system 120) or in the form of "n" individual microphones mounted at various locations in the cabin of the vehicle 105.

At block 425, a determination is made whether data associated with the vocal utterance is adequate for unambiguously identifying a location of the occupant who produced the vocal utterance in the vehicle 105. For example, an analysis of the vocal utterance (block 410) by executing an artificial intelligence detection procedure or a learning-based detection procedure may provide an indication that the driver 125 is the speaker. Based on this indication, at block 430, the location of the occupant (the driver seat 126, in this example) is identified. As another example, the amplitude information obtained upon deconvolving the vocal utterance (block 415) and/or the angle of arrival information (block 420) may be adequate for identifying the location of the occupant who produced the vocal utterance in the vehicle 105.

In some cases, the data associated with the vocal utterance may be inadequate for unambiguously identifying the location of the occupant who produced the vocal utterance in the vehicle 105. In these cases, at block 435, the processor 205 of the occupant locator system 115 may use a lookup table such as, for example, the lookup table 300 described above.

At block 440, the processor 205 may evaluate the vocal utterance by referring to the voice amplitude data provided in table 300 (either independently or in combination with the angle of arrival data provided in table 300) to deduce a location of the occupant who produced the vocal utterance. For example, the processor 205 may identify the driver seat 126 as the location of the occupant who produced the voice utterance. The identification may be based on determining that an amplitude of the deconvolved voice (block 415) lies inside a range of 81 dB and 87 dB (shown in table 300) and/or that the angle of arrival (block 420) of the audio signal lies within a range of 50 degrees and 95 degrees (shown in table 300).

In some cases, more than one individual may speak in a substantially simultaneous manner. For example, the driver 125 may issue a first voice command to the infotainment system 165 to tune to a desired radio station. The passenger 130 may simultaneously issue a second voice command to the infotainment system 165 to tune to a different radio station. In such cases, the processor 205 may apply a first weight to the vocal utterance when originated by the occupant of the driver seat 126 (the driver 125) and a second weight to the vocal utterance when originated by the occupant of the front passenger seat 131 (the passenger 130), the first weight granting a higher privilege than the second weight. Consequently, the processor 205 may cooperate with the infotainment system 165 to tune to the radio station desired by the driver 125 rather than the one desired by the passenger 130.

Further, the processor 205 may recognize that two speakers are speaking concurrently and may issue a request (via the display screen of the infotainment system 165 and/or the speaker of the infotainment system 165) for a single individual to repeat the vocal utterance.

In the above disclosure, reference has been made to the accompanying drawings, which form a part hereof, which illustrate specific implementations in which the present disclosure may be practiced. It is understood that other implementations may be utilized, and structural changes may be made without departing from the scope of the present disclosure. References in the specification to "one embodiment," "an embodiment," or "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, one skilled in the art will recognize such feature, structure, or characteristic in connection with other embodiments whether or not explicitly described.

Implementations of the systems, apparatuses, devices, and methods disclosed herein may comprise or utilize one or more devices that include hardware, such as, for example, one or more processors and system memory, as discussed herein. An implementation of the devices, systems, and methods disclosed herein may communicate over a computer network. A "network" is defined as one or more data links that enable the transport of electronic data between computer systems and/or modules and/or other electronic devices. When information is transferred or provided over a network or another communications connection (either hardwired, wireless, or any combination of hardwired or wireless) to a computer, the computer properly views the connection as a transmission medium. Transmission media can include a network and/or data links, which can be used to carry desired program code means in the form of computer-executable instructions or data structures and which can be accessed by a general purpose or special purpose computer. Combinations of the above should also be included within the scope of non-transitory computer-readable media.

Computer-executable instructions comprise, for example, instructions and data which, when executed at a processor, such as the processor 205, cause the processor to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

A memory device such as the memory 225, can include any one memory element or a combination of volatile memory elements (e.g., random access memory (RAM, such as DRAM, SRAM, SDRAM, etc.)) and non-volatile memory elements (e.g., ROM, hard drive, tape, CDROM, etc.). Moreover, the memory device may incorporate electronic, magnetic, optical, and/or other types of storage media. In the context of this document, a "non-transitory computer-readable medium" can be, for example but not limited to, an electronic, magnetic, optical, electromagnetic, infrared, or semiconductor system, apparatus, or device. More specific examples (a non-exhaustive list) of the computer-readable medium would include the following: a portable computer diskette (magnetic), a random-access memory (RAM) (electronic), a read-only memory (ROM) (electronic), an erasable programmable read-only memory (EPROM, EEPROM, or Flash memory) (electronic), and a portable compact disc read-only memory (CD ROM) (optical). Note that the computer-readable medium could even be paper or another suitable medium upon which the program is printed, since the program can be electronically captured, for instance, via optical scanning of the paper or other medium, then compiled, interpreted or otherwise processed in a suitable manner if necessary, and then stored in a computer memory.

Those skilled in the art will appreciate that the present disclosure may be practiced in network computing environments with many types of computer system configurations, including in-dash vehicle computers, personal computers, desktop computers, laptop computers, message processors, handheld devices, multi-processor systems, microprocessor-based or programmable consumer electronics, network PCs, minicomputers, mainframe computers, mobile telephones, PDAs, tablets, pagers, routers, switches, various storage devices, and the like. The disclosure may also be practiced in distributed system environments where local and remote computer systems, which are linked (either by hardwired data links, wireless data links, or by any combination of hardwired and wireless data links) through a network, both perform tasks. In a distributed system environment, program modules may be located in both the local and remote memory storage devices.

Further, where appropriate, the functions described herein can be performed in one or more of hardware, software, firmware, digital components, or analog components. For example, one or more application specific integrated circuits (ASICs) can be programmed to carry out one or more of the systems and procedures described herein. Certain terms are used throughout the description, and claims refer to particular system components. As one skilled in the art will appreciate, components may be referred to by different names. This document does not intend to distinguish between components that differ in name, but not in function.

At least some embodiments of the present disclosure have been directed to computer program products comprising such logic (e.g., in the form of software) stored on any computer-usable medium. Such software, when executed in one or more data processing devices, causes a device to operate as described herein.

While various embodiments of the present disclosure have been described above, it should be understood that they have been presented by way of example only, and not limitation. It will be apparent to persons skilled in the relevant art that various changes in form and detail can be made therein without departing from the spirit and scope of the present disclosure. Thus, the breadth and scope of the present disclosure should not be limited by any of the above-described example embodiments but should be defined only in accordance with the following claims and their equivalents. The foregoing description has been presented for the purposes of illustration and description. It is not intended to be exhaustive or to limit the present disclosure to the precise form disclosed. Many modifications and variations are possible in light of the above teaching. Further, it should be noted that any or all of the aforementioned alternate implementations may be used in any combination desired to form additional hybrid implementations of the present disclosure. For example, any of the functionality described with respect to a particular device or component may be performed by another device or component. Further, while specific device characteristics have been described, embodiments of the disclosure may relate to numerous other device characteristics. Further, although embodiments have been described in language specific to structural features and/or methodological acts, it is to be understood that the disclosure is not necessarily limited to the specific features or acts described. Rather, the specific features and acts are disclosed as illustrative forms of implementing the embodiments. Conditional language, such as, among others, "can," "could," "might," or "may," unless specifically stated otherwise, or otherwise understood within the context as used, is generally intended to convey that certain embodiments could include, while other embodiments may not include, certain features, elements, and/or steps. Thus, such conditional language is not generally intended to imply that features, elements, and/or steps are in any way required for one or more embodiments.

That which is claimed is:

1. A method comprising:
   deconvolving, by a processor, a vocal utterance by an occupant of a vehicle;
   determining, by the processor, an angle of arrival of the vocal utterance; and
   identifying, by the processor, a location of the occupant in the vehicle based on evaluating the deconvolved vocal utterance and the angle of arrival of the vocal utterance, wherein evaluating the deconvolved vocal utterance comprises determining, by the processor, an amplitude of the vocal utterance, and wherein identifying the location of the occupant in the vehicle comprises using, by the processor, location information of one of a driver seat or a passenger seat in the vehicle.

2. The method of claim 1, wherein deconvolving the vocal utterance comprises applying, by the processor, a cabin impulse response to the vocal utterance.

3. The method of claim 1, further comprising:
   identifying, by the processor, an identity of the occupant based on analyzing the vocal utterance of the occupant.

4. The method of claim 1, wherein identifying the location of the occupant in the vehicle based on evaluating the deconvolved vocal utterance and the angle of arrival of the vocal utterance comprises:
   utilizing, by the processor, a lookup table containing voice amplitude data and angle of arrival data associated with at least one seat in the vehicle.

5. The method of claim 4, wherein the lookup table is utilized upon a failure to identify the location of the occupant in the vehicle based on an independent evaluation of the deconvolved vocal utterance and the angle of arrival of the vocal utterance.

6. The method of claim 5, wherein the independent evaluation includes executing at least one of an artificial intelligence detection procedure or a learning-based detection procedure.

7. The method of claim 6, wherein executing the learning-based detection procedure comprises:
   obtaining a voice sample of the occupant when seated in a first seat of the vehicle;
   storing the voice sample in a database; and
   retrieving the voice sample for executing the learning-based detection procedure.

8. A method comprising:
   determining, by a processor, an amplitude of a vocal utterance originated by an occupant of a vehicle;
   identifying, by the processor, an identity of the occupant based on analyzing the vocal utterance;
   determining, by the processor, an angle of arrival of the vocal utterance; and
   identifying, by the processor, a location of the occupant in the vehicle based on evaluating the amplitude of the vocal utterance and the angle of arrival of the vocal utterance, wherein identifying the location of the occupant in the vehicle comprises using, by the processor, location information of one of a driver seat or a passenger seat in the Vehicle.

9. The method of claim 8, wherein determining the amplitude of the vocal utterance comprises deconvolving the vocal utterance by applying a cabin impulse response to the vocal utterance.

10. The method of claim 8, further comprising:
    applying, by the processor, a first weight to the vocal utterance when originated by the occupant of the driver seat and a second weight to the vocal utterance when originated by the occupant of the passenger seat, the first weight granting a higher privilege than the second weight.

11. The method of claim 10, wherein the vocal utterance is a command directed at a device in the vehicle for performing an operation.

12. The method of claim 8, wherein identifying the location of the occupant in the vehicle based on evaluating the vocal utterance and the angle of arrival of the vocal utterance comprises:
    selecting, by the processor, a lookup table based on a make and a model of the vehicle, the lookup table containing voice amplitude data and angle of arrival data associated with a seat in the make and model of the vehicle; and
    utilizing, by the processor, the lookup table to identify the location of the occupant in the vehicle.

13. A vehicle comprising:

an occupant locater system comprising:

a memory that stores computer-executable instructions; and a processor configured to access the memory and execute the computer-executable instructions to perform operations comprising:

deconvolving a vocal utterance by an occupant of the vehicle;

determining an angle of arrival of the vocal utterance; and identifying a location of the occupant in the vehicle based on evaluating the deconvolved vocal utterance and the angle of arrival of the vocal utterance, wherein evaluating the deconvolved vocal utterance comprises determining an amplitude of the vocal utterance, and wherein identifying the location of the occupant in the vehicle comprises using location information of one of a driver seat or a passenger seat in the vehicle.

14. The vehicle of claim 13, wherein deconvolving the vocal utterance comprises applying a cabin impulse response to the vocal utterance.

15. The vehicle of claim 13, wherein the processor is configured to access the memory and execute additional computer-executable instructions to perform operations comprising:

identifying an identity of the occupant based on analyzing the vocal utterance of the occupant.

16. The vehicle of claim 13, wherein identifying the location of the occupant in the vehicle based on evaluating the deconvolved vocal utterance and the angle of arrival of the vocal utterance comprises:

utilizing a lookup table containing voice amplitude data and angle of arrival data associated with at least one seat in the vehicle.

17. The vehicle of claim 16, wherein the lookup table is utilized upon a failure to identify the location of the occupant in the vehicle based on an independent evaluation of the deconvolved vocal utterance and the angle of arrival of the vocal utterance.

* * * * *